(12) United States Patent
Agmon et al.

(10) Patent No.: US 12,147,526 B2
(45) Date of Patent: Nov. 19, 2024

(54) BEHAVIORAL BIOMETRICS VERIFICATION ADAPTATION FOR CROSS DEVICES

(71) Applicant: International Business Machines Corporation, Armonk, NY (US)

(72) Inventors: Noga Agmon, Giv'at Shmuel (IL); Itay Hazan, Beer Sheva (IL); Matan Levi, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 17/505,167

(22) Filed: Oct. 19, 2021

(65) Prior Publication Data
US 2023/0119939 A1    Apr. 20, 2023

(51) Int. Cl.
G06F 21/45 (2013.01)
G06F 21/31 (2013.01)
G06F 21/32 (2013.01)

(52) U.S. Cl.
CPC ............ G06F 21/45 (2013.01); G06F 21/316 (2013.01); G06F 21/32 (2013.01)

(58) Field of Classification Search
CPC .......... G06F 21/31; G06F 21/62; G06F 21/64; G06F 21/32; G06F 21/316; G06F 21/45;
(Continued)

(56) References Cited

U.S. PATENT DOCUMENTS

| 11,636,394 B2* | 4/2023 | Yang | G06Q 30/0201 706/12 |
|---|---|---|---|
| 2012/0204257 A1 | 8/2012 | O'Connell et al. | |

(Continued)

FOREIGN PATENT DOCUMENTS

| WO | 2015088537 A1 | 6/2015 | |
|---|---|---|---|
| WO | 2016157075 A1 | 10/2016 | |
| WO | WO-2020005240 A1 * | 1/2020 | G06F 16/9536 |

OTHER PUBLICATIONS

Abuhamad et al., "Sensor-based Continuous Authentication of Smartphones' Users Using Behavioral Biometrics: A Contemporary Survey", Published in IEEE Internet of Things Journal, vol. 8, Issue 1, Jan. 1, 2021, Published Date Aug. 28, 2020, 19 pages.
(Continued)

*Primary Examiner* — Josnel Jeudy
(74) *Attorney, Agent, or Firm* — Daniel J Blabolil

(57) ABSTRACT

Techniques for verifying the identity of users transferring between devices are disclosed. An example method includes receiving device usage data by monitoring user-device interactions of a first set of users interacting with a first device and a second set of users interacting with a second device. The method also includes extracting features from the data and aggregating feature samples from the user-device interactions for first set of users and the second set of users. The method also includes generating a score for each feature based on an analysis the feature samples. The feature score indicates a degree to which the first set of feature samples and the second set of feature samples differentiate between the devices. The method also includes identifying features as transferrable if the score is below a specified threshold, and generating a new behavior model by modifying existing user behavior data according to the transferrable features.

20 Claims, 3 Drawing Sheets

(58) Field of Classification Search
CPC .......... G06F 21/00; G06F 21/60; G06N 3/04; H04W 12/002
USPC .......................................................... 726/18
See application file for complete search history.

(56) References Cited

U.S. PATENT DOCUMENTS

| | | |
|---|---|---|
| 2014/0247239 A1 | 9/2014 | Jamshidi-Roudbari et al. |
| 2014/0300554 A1 | 10/2014 | Samuel et al. |
| 2016/0021081 A1 | 1/2016 | Caceres et al. |
| 2017/0161478 A1* | 6/2017 | Stavrou ................... G06F 21/32 |
| 2017/0337364 A1* | 11/2017 | Whaley .................... G06F 21/32 |
| 2018/0034850 A1* | 2/2018 | Turgeman ........... G06Q 30/0275 |
| 2018/0068098 A1* | 3/2018 | Finzi .................... H04W 12/068 |
| 2019/0044942 A1* | 2/2019 | Gordon ............. H03M 13/3972 |
| 2019/0220583 A1 | 7/2019 | Douglas et al. |
| 2020/0233952 A1* | 7/2020 | Hazan ...................... G06F 21/45 |
| 2022/0101161 A1* | 3/2022 | Goel ........................ G06N 20/00 |
| 2022/0180391 A1* | 6/2022 | Prakash ............. G06Q 30/0205 |
| 2022/0207284 A1* | 6/2022 | Duvvuri ................... G06N 7/01 |

OTHER PUBLICATIONS

Alzubaidi et al., "Authentication of Smartphone Users Using Behavioral Biometrics", Journal of IEEE Communications Surveys and Tutorials, vol. 18, Issue 3, Mar. 2, 2016, 32 pages.
Nguyen et al., "Touchscreen Biometrics Across Multiple Devices", 6 pages, May 29, 2024.
Wang et al., "Towards Continuous and Passive Authentication Across Mobile Devices: An Empirical Study", WiSec 17, Jul. 2017, Boston, MA, 11 pages.

* cited by examiner

BEHAVIORAL BIOMETRICS VERIFICATION ADAPTATION FOR CROSS DEVICES

BACKGROUND

The present techniques relate to behavioral biometrics verification. More specifically, the techniques relate to adapting behavioral biometrics models across different devices.

Mobile smartphones and tablets are in wide global usage, and serve users for accessing security sensitive services such as online payments, banking, and registration to service providers via mobile device applications and/or websites.

One type of solution to verify user identity for accessing security sensitive services may be implemented by user passwords, user fingerprints read from a dedicated sensor, or by 2-factor authentication methods. A major drawback is once a user identity is verified, it is not possible to know whether the user is the same throughout a session. Another type of solution which addresses the issue, and may be used as augmentation to the former solution type, is continuous mobile verification, which verifies user identity throughout a session, and between sessions. An efficient method to implement continuous mobile verification is by monitoring user-device interactions by monitoring touchscreen sensors. Touchscreen sensors often include sensors which record finger(s) position on a touchscreen, and size and pressure of the finger(s) interaction with the touchscreen. Models for mobile behavior biometrics often learn user-device interaction by learning specific patterns of finger contact position, size, and pressure characteristic of each user's habits. These patterns often comprise sessions of presses and swipes, and may be learned using machine learning methods in order to construct a user behavior model for each user, which may be used to verify user identity in a continuous manner during a session.

SUMMARY

According to an embodiment described herein, a method for generating user behavior models for verification across devices includes receiving device usage data generated by monitoring user-device interactions of a first set of users interacting with a first device and a second set of users interacting with a second device. The method also includes generating a first set of feature samples from the user-device interactions of the first set of users, and generating a second set of feature samples from the user-device interactions of the second set of users. The method also includes generating a score for the feature based on an analysis of the first set of feature samples and the second set of feature samples. The feature score indicates a degree to which the first set of feature samples and the second set of feature samples differentiate between the devices. The method also includes identifying the feature as transferrable if the score is below a specified threshold. The method also includes for a specific user, generating a new behavior model for use with a new device by modifying existing user behavior data applicable for an existing device according to the transferrable features.

According to another embodiment described herein, a system for generating user behavior models includes at least one memory storage device to store usage data generated by monitoring user-device interactions of a first set of users interacting with a first device and a second set of users interacting with a second device. The system also includes at least one processor configured to, for each one of a set of features: generate a first set of feature samples from the user-device interactions of the first set of users, and generate a second set of feature samples from the user-device interactions of the second set of users; generate a score for the feature based on an analysis of the first set of feature samples and the second set of feature samples, wherein the feature score indicates a degree to which the first set of feature samples and the second set of feature samples differentiate between the devices; and identify the feature as transferrable if the score is below a specified threshold. A new behavior model for use with a new device can be generated by modifying existing user behavior data applicable for an existing device according to the transferrable features.

According to another embodiment described herein, a computer program product can include computer-readable storage medium having program code embodied therewith. The computer readable storage medium is not a transitory signal per se. The program code executable by a processor to cause the processor to receive device usage data generated by monitoring user-device interactions of a first set of users interacting with a first device and a second set of users interacting with a second device. The program code also causes the processor to, for each one of a set of features: generate a first set of feature samples from the user-device interactions of the first set of users, and generate a second set of feature samples from the user-device interactions of the second set of users; generate a score for the feature based on an analysis of the first set of feature samples and the second set of feature samples, wherein the feature score indicates a degree to which the first set of feature samples and the second set of feature samples differentiate between the devices; and identify the feature as transferrable if the score is below a specified threshold. The program code also causes the processor to generate, for a specific user, a new behavior model for use with a new device by modifying existing user behavior data applicable for an existing device according to the transferrable features.

DETAILED DESCRIPTION

Figure 1:
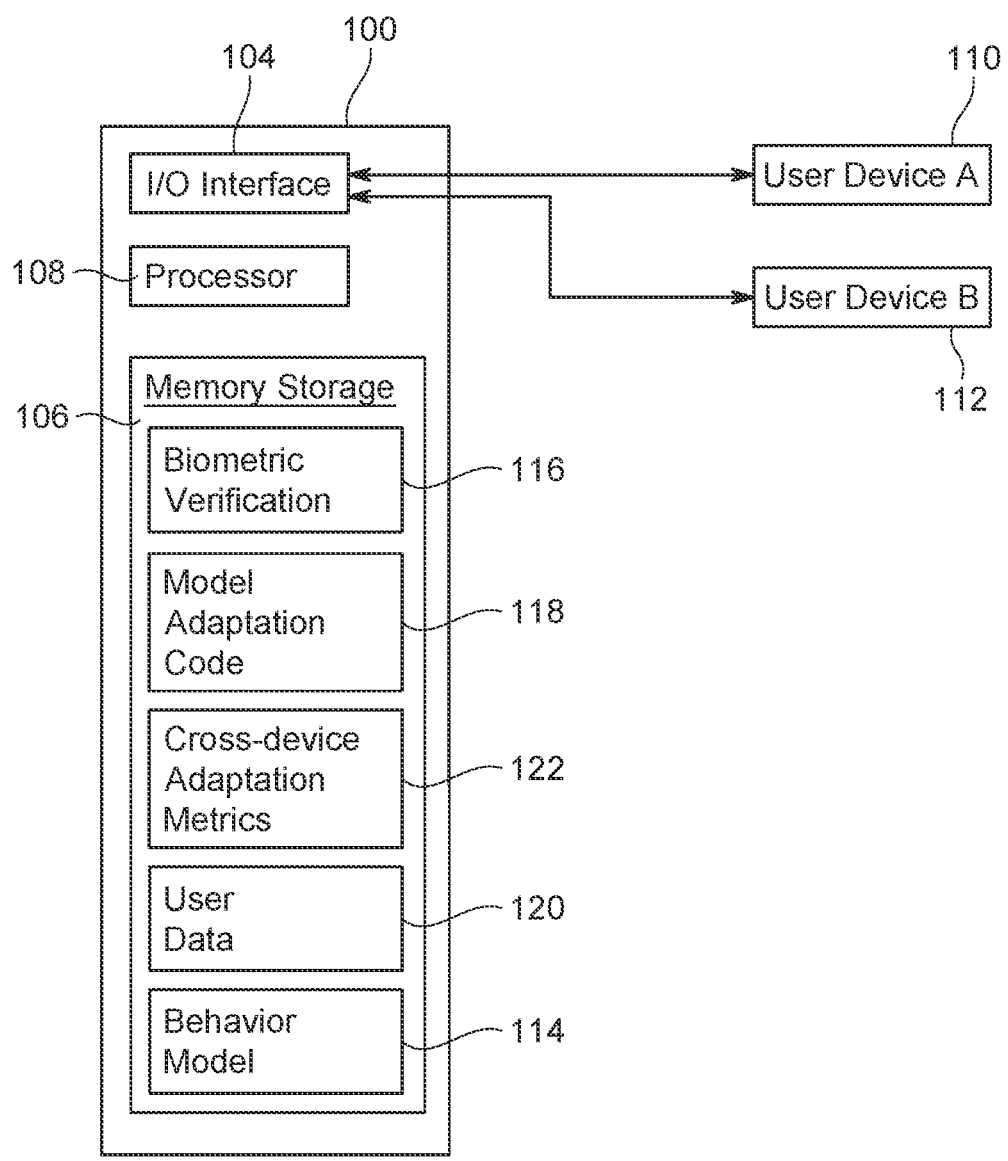
FIG. 1 is a block diagram of an example behavior verification system, which may be each implemented as software and/or firmware, according to some embodiments of the present techniques.

Mobile touch verification technologies allow verifying the identity of users through their smartphones by their unique interaction patters, and therefore enabling an additional layer of security for preventing illegitimate access to protected resources. These technologies can be based on various methods that analyzes each user's touches using sophisticated algorithms. Eventually these algorithms, after a training period, can produce a score for whether the touches belong to the user in question. These technologies can be used as an additional factor of authentication in parallel to passwords, PINS, or physical biometrics. The fact that the touch sensors collects the data throughout the session allows it to do the verification continuously and can therefore prevent cases of hijacking sessions or remote takeover after the session begins.

Mobile touch verification technology works by collecting a session of events data from the screen sensors such as swipes or presses that can be categorized according to its attributes such as velocity, duration, and distance. Relevant features of the events data are then extracted such as the average speed, maximal pressure, and movement curvature. Many different user behavior features related to each event can be extracted. These extracted features may then be used to generate a behavior model using, for example, statistical analysis or a machine learning algorithm such as a deep learning algorithm that is trained using the extracted features or the raw data. These user specific behavior models can be used to process subsequent event data collected from the user to generate a probability that the event correlates with the correct user, which can alert the service providers for possible impostors.

The techniques described above may not be useful in situations in which the user traversed between different devices. For example, access to a protected system may seem suspicious if the user begins using a new device, because the established behavior model may not correspond with the event data received from a new device. Allowing users with new devices to bypass mobile touch verification to access systems has potential to draw attention from masqueraders to perform illegitimate activities. On the other hand, long sign-in process requests from users with new devices can causes frustration and abandonment from users.

As the data is dependent on characteristics of the touch sensors, the extracted features become attached to the device, and the generated behavior models in turn may not be effective for verifying the identity of the users with a new device. These dependencies may be due to the different screen sizes, pixel density, sampling rate, pressure and size sensors and more. Different manufacturers use different sensors, and sensors of the same manufacturer may change and improve with time. This can generate various movements that appear differently in the distribution of the same features, for the same users. These differences affect the behavior models developed for each user, which may therefore be useful to verify the identity of users only in the device where the data was collected.

Many features change their distribution when traversing between different devices, so their effectiveness decreases. Some features might be able to be adapted through changing some of the raw data. For example, the event distance might be usable if the coordinates can be adapted to represent inches instead of pixels using the pixel density per inch (DPI). Additionally, some features may be inherently usable through different devices without any changes, such as the event time duration, which is an objective measure that can be calculated through all devices in milliseconds. However, not all features can be adapted or used without change, especially those that are highly dependent on the used device and the similarities between the sensors. For example, the pressure sensors in different devices might measure pressure differently, which could generate an apparent change in behavior.

Identifying which features can be used exactly as is, which features could be used after adaptation, and which features cannot be used at all is not an easy task. One complication is that there are a wide variety of different devices, each of which exhibit different feature attributes that may correspond with some devices, but not others. Thus, which feature could be used and exactly how is highly dependent on the specific pair of devices in question. This means that the task of identifying suitable features applicable or adaptable across devices will have different outcomes depending on the used devices. One option to identify such features is to use only a small set of features that will fit all devices. However, this will result in a very low accuracy as the number of features that can shift between every device to every other device is highly limited.

The techniques disclosed herein describe ways to automatically identify the relevant features and the needed adaptations of features for use in touch verification across different devices. In accordance with embodiments, the user identification features of a device are scored according to their probability of being able to shift from one device to another. The features that are more likely to be shifted correctly to a new device can be used for user verification on the new device, while other features may be disregarded. The present techniques are also used to identify features that can be shifted between the two devices but with a certain adaptation. This enables the generated behavior models to be adapted for used across different devices to verify the identity of users more accurately. Such shiftable features and there adaptations may be identified automatically, i.e., without user intervention.

For this reason we score the features for their ability to shift between devices. After each adaptation, the features can be scored differently. Feature scoring can be performed empirically such that for each pair of devices, a set of data from several users will be taken to represent the variability in each device and the differences between the devices. Each feature of each device pair can be compared to develop a score that indicates the ability of the feature to be shifted from one device to the other. The scoring can be done in several ways. For example, for a particular pair of devices, a random forest classifier can be trained on the feature data to differentiate between the two devices. Those features that tend to differentiate between the devices can be scored as having a higher "feature importance" in regards to the ability of the feature to distinguish between devices. This feature score can be inferred by the number of nodes in the trees using the feature and their location in the trees. The higher the feature score the less likely that the feature can be transferred between the devices. The lower the feature score the more likely that the feature can be transferred between the devices.

After each scoring step, a decision can be made for each feature regarding their ability to be shifted from the first device to the second device. Those features that are below a certain threshold are generating a similar distribution between the two devices and can therefore be used without changes for this particular pair of devices. Features that are scored above this threshold should be either adapted differently or discarded. Once an adaptation is performed, the process of evaluation and scoring can be performed again. Several rounds of adaptation and scoring may be performed to identify potentially useful adaptations. Eventually those features that are still above the applicable threshold after one or more adaptation attempts may be discarded.

The remaining features, including the adapted features and those that can be shifted without changes, may be used to generate a new behavior model for a user's new device. The new behavior model can be used to accurately verify user identity in cases where the historical data relevant to the new device for this user does not exist or is insufficient to build a model for the new device. Accordingly, the techniques described herein can be used to build new user behavior models for verifying user identity in new devices where the user has no history or a limited history of interactions. Enabling user authentication on new devices in this way reduces friction without relying on several factors of authentication for new devices, resulting in a better user experience.

It is to be understood that the present techniques are not necessarily limited in its application to the details of construction and the arrangement of the components and/or methods set forth in the following description and/or illustrated in the drawings and/or the examples. The invention is capable of other embodiments or of being practiced or carried out in various ways.

The present techniques may be embodied in a system, a method, and/or a computer program product. The computer program product may include a computer readable storage medium (or media) having computer readable program instructions thereon for causing a processor to carry out aspects of the present techniques.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Each of the described systems includes and each of the described methods is implemented using a processing circuitry configured to execute a code. The processing circuitry may comprise hardware and firmware and/or software. For example, the processing circuitry may comprise one or more processors and a non-transitory medium connected to the one or more processors and carrying the code. The code, when executed by the one or more processors, causes the system to carry out the operations described herein.

FIG. 1 is a block diagram of an example behavior verification system, which may be each implemented as software and/or firmware, according to some embodiments of the present techniques. The system 100, includes an I/O interface 104, a memory storage 106 containing the code instructions, and one or more processors 108 adapted to execute the code. In use, the I/O interface 104 receives monitored user-device interactions from one or more user devices, including user device A 110 and user device B 112. The user-device interactions may be finger swipes on a device touchscreen or other actions detected by sensors on the device such as accelerometers, gyroscopes, light sensors, and other sensors or combinations thereof. In the present example, user device A 110 and user device B 112 are devices used by the same user. However, it will be appreciated that the system 100 may be in communication with several devices of several users.

User device interactions received from user device A 110 may be processed to generate a user behavior model, also referred to herein simply as a "behavior model." The memory storage 106 may include a repository of behavior models 114, which may include behavior models for several users and several different devices. Each behavior model 114 corresponds with a particular user and is based on one or more features extracted from sessions of user events (swipes/interactions) that describes the expected behaviors of the corresponding user.

Biometric verification code 116 may be used to continuously monitor user behavior by collecting user-device interactions from the user devices and analyzing the interactions to extract features. The biometric verification code 116 can compare these extracted features to the corresponding behavior model applicable for the monitored device and user. If the monitored extracted features of the events match the behavior model or are similar to within a specified threshold, the biometric verification code 116 can generate a response indicating verification of the identity of the user. If the monitored extracted features of the events do not match the behavior model, the biometric verification code 116 can generate a response indicating that the identity of the user is not verified. If the identity is not verified, the system can take action to prevent unauthorized access to a protected resource such as a bank account, for example.

The system 100 is also able to perform validation of users actions performed on devices not previously verified by the system, without any additional requirements from users. The behavior models 114 may include models applicable for the user for different devices such as device A 110 and device B 112. If the monitored user behavior is received from device A 110, then the behavior model applicable for device A 100 will be used for the biometric verification. If the monitored user behavior is received from device B 112, then the behavior model applicable for device B 112 will be used.

In some instances, the user may have an established behavior model for device A 110, but not for device B 112. To enable user verification on device B 112 in the first instance of receiving user actions from device B 112, a new behavior model may be generated for device B 112 based, in part, on the features stored to the behavior model applicable for device A 110.

The system 100 also includes model adaptation code 118, which operates to process user data 120 to generate cross-device adaptation metrics 122. As explained above, some extracted feature data may not be usable across devices, so some analysis is performed to determine which features may be transferable to the new behavior model or which features may be transferable after some adaptation. This analysis may be performed to generate the cross-device adaptation metric 122 through the processing of data selected from the repository of user data 120, which includes event session data for a large plurality of users over a plurality of devices. The determination of whether a feature is adaptable or transferable is made based on comparing the interactions of multiple users on device A with the interactions of multiple users on device B. Through this analysis, the system can generate cross-device adaptation metrics 122 for selected pairs of devices. Each cross-device adaptation metric 122 may indicate which features can be transferred from the behavior model applicable for device A to the behavior model applicable to device B and what, if any, adaptation is to be performed for each feature. The adaptation may be a mathematical transformation of the feature data values generated for the original device, device A.

If the system 100 detects that a user is using a new device, the system 100 can use the applicable cross-device adaptation metric 122 to generate a new behavior model for device B. Specifically, the cross-device adaptation metric 122 indicates which features can be transferred from the existing behavior model to the new behavior model and also describes the particular adaptations to be applied to each of the existing features values, if any. The generation of the cross-device adaptation metric 122 for particular pairs of devices may be performed in advance or upon detecting user activity indicating that a user has switched between the devices in the pair.

Once the new behavior model for a user has been generated, continuous monitoring and user verification can be performed on the new device, device B 112. Additionally, the new behavior model may be further refined over time by fine-tuning existing parameters or adding new sessions and features based on user interactions received from device B. In this way, the system 100 may gradually become more accurate over time. The process for generating cross-device adaptation metrics for users from existing user data of other devices is describe further in relation to FIG. 3.

It is to be understood that the block diagram of FIG. 1 is not intended to indicate that the system 100 is to include all of the components shown in FIG. 1. Rather, the system 100 can include fewer or additional components not illustrated in FIG. 1.

Figure 2:
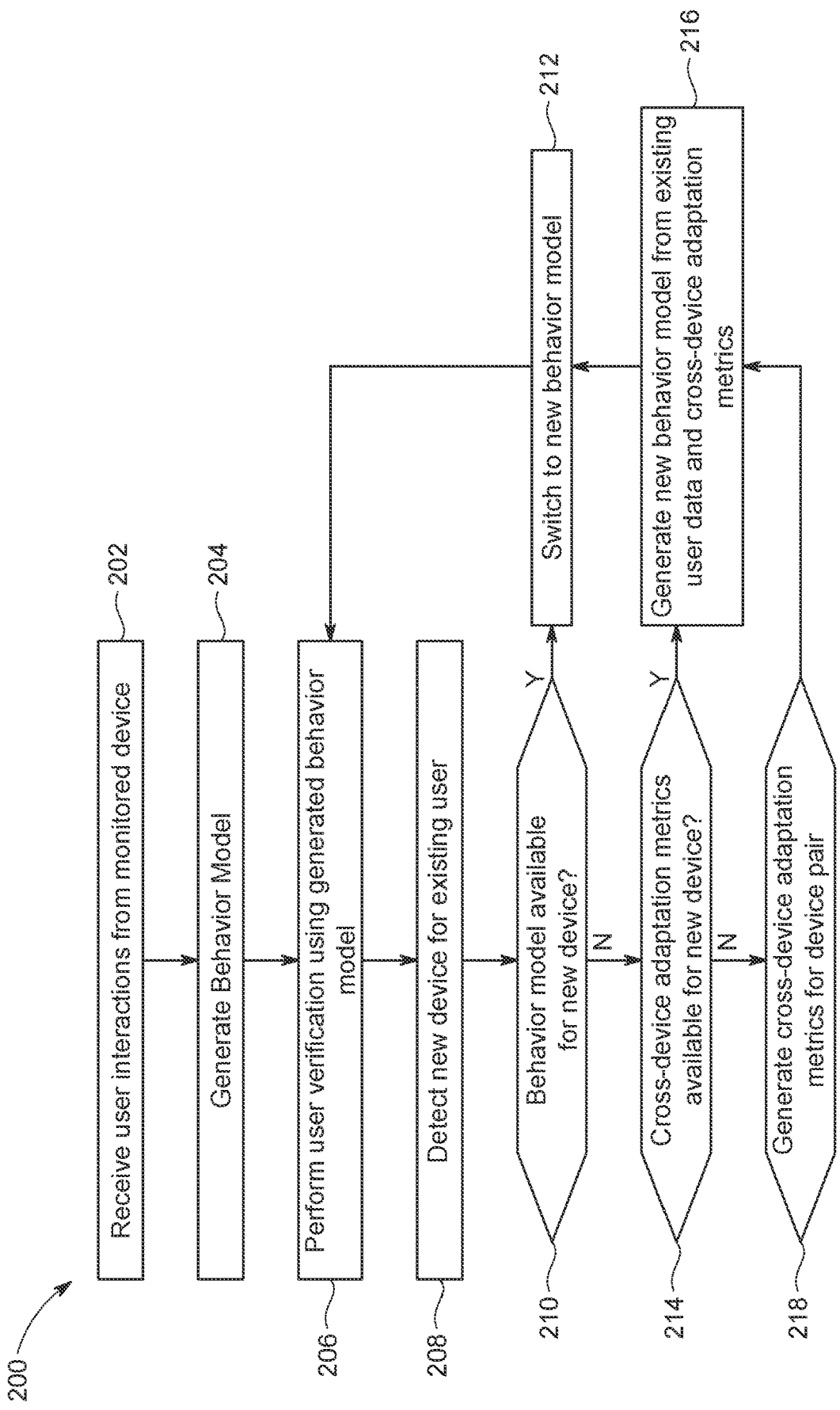
FIG. 2 is a process flow diagram of an example method of operating behavior verification system, according to some embodiments of the present techniques.

FIG. 2 is a process flow diagram of an example method of operating behavior verification system, according to some embodiments of the present techniques. The method 200 can be implemented with any suitable computing device, such as the system 100 of FIG. 1. The method may begin at block 202.

At block 202, user interactions are received from a user device such as smart phone, tablet PC, laptop computer, and the like. The user interactions may be interactions such as presses or swiped on a touch screen, movements of the device detected by an accelerometer, button pressed, and others. Each user interaction may be referred to herein as an interaction event or simply as an event. Various parameters of the user interactions may be extracted such as speed, distance, and shape of a swipe, spatial orientation of the device and changes in the spatial orientation, and others. The extracted parameters may be used to determine features.

At block 204, the extracted features are used to generate a behavior model describing typical user behaviors when interacting with the device. The behavior model is specific to the user and the device and may be generated after a sufficient number of sessions have been collected from the device.

At block 206, the behavior model is used to perform user verification. User verification may be performed in a continuous manner while the user is logged into a protected system or account. User verification may involve comparing the extracted features stored to the behavior model with newly acquired extracted features of event session collected during monitoring. The similarity between the behavior model and the newly acquired extracted features can be used to generate a probability that the user currently interacting with the device is the authentic user.

At block 208, a switch to a different device is detected for the user. A switch to a different device may be detected when the user tries to access a protected resource from a device that is different from the device for which the current behavior model was generated. For example, the different device may be a different smart phone model, or a different type of device, i.e., a smart phone to a tablet.

At block 210, a determination is made regarding whether a behavior model is available for the same user that is applicable to the different device. In some cases, an existing behavior model may be available if the user has previously used the different device in the past such that a history of user interactions from this device has already been acquired. If a behavior model is already available, the process flow advances to block 212, wherein the verification process switches to the behavior model applicable to the different device. If no behavior model is available for the device, the process flow advances to block 212.

At block 212, a determination is made regarding whether a cross-device adaptation metric is available for the new device paired with the old device. The cross-device adaptation metric describes features that can be used with both devices, and also describes any adaptations to be applied to make a feature from one device usable on another device. If the cross-device adaptation metric is available, the process flow advances to block 216, wherein a new behavior model is generated based on the existing user data for the user as configured according to the cross-device adaptation metric. If the cross-device adaptation metric is not available, the process flow advances to block 218.

At block 218, a cross-device adaptation metric is generated for the pair of devices. Techniques for generating the cross-device adaptation metric are described more fully in relation to FIG. 3. After generating the cross-device adaptation metric, the process flow can advance to block 216. The cross-device adaptation metric is stored information that can be used for any pair of specific devices for which the metrics were generated, and is not user specific. Accordingly, the cross-device adaptation metric can be stored and re-used for other users in the future upon detecting that another user has switched between the same two devices.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
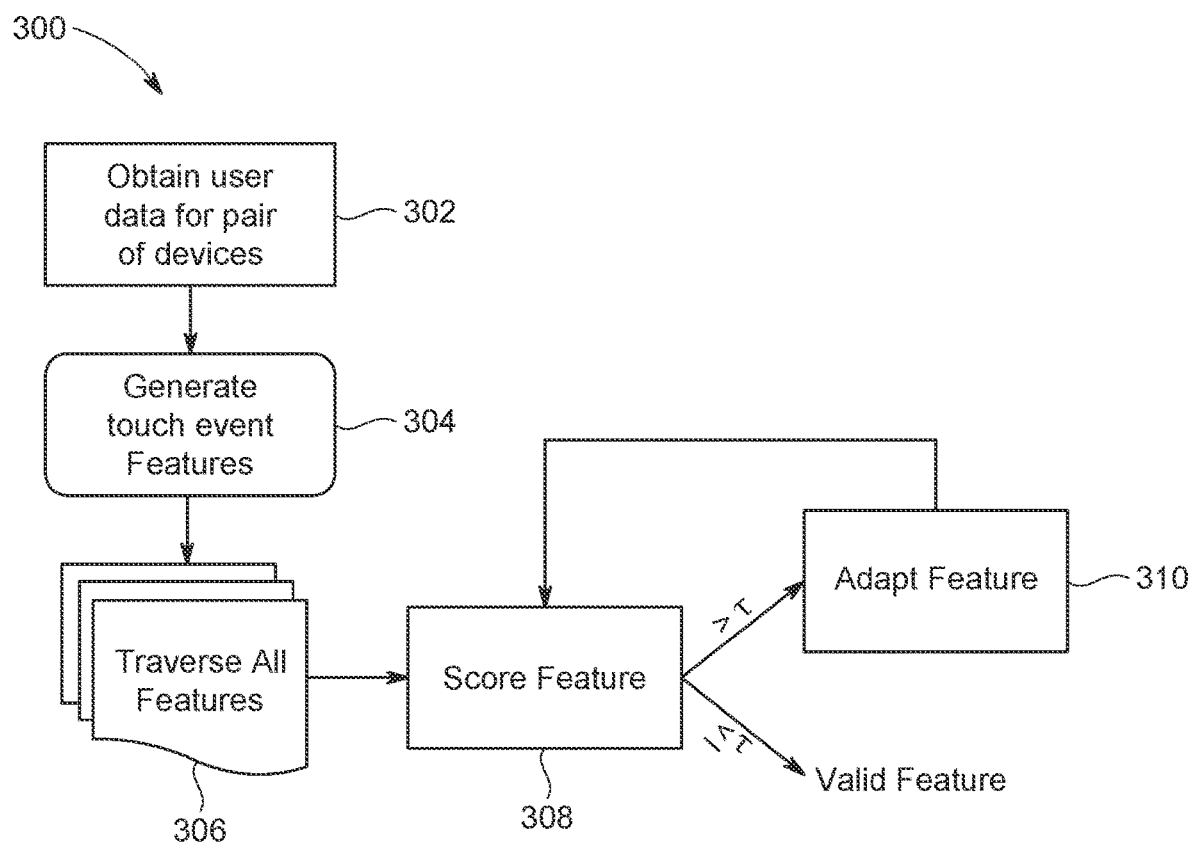
FIG. 3 is a process flow diagram describing an example technique for generating a cross-device feature model, according to some embodiments of the present techniques.

FIG. 3 is a process flow diagram describing an example technique for adapting an existing user behavior model for use with a new user device, according to some embodiments of the present techniques. The method 300 can be implemented with any suitable computing device, such as the system 100 of FIG. 1. For example, the process can be performed using the model adaptation code 118 of FIG. 1 to generate a cross-device feature metric. The process begins at block 302.

At block 302, user data is obtained for a selected pair of devices. The pair of devices includes a first device and a second device, which may be a different type of device or different model. For example, the first device may be a smart phone and the second device may be a tablet PC, or both device may be different models of smart phones, i.e., different manufacturers, different models, or different versions of the same model. The obtained data relates to the recorded user interactions of a first set of users interacting with a first device and a second set of users interacting with a second device. The user interaction data for each device will include the interactions of several users. In some cases, some or all of the user's may have provided data for both devices. However, the present techniques may also be applied when there is no overlap between the user's that provided data for the first device and the users that provided data for the second device. In other words, there may or may not be overlap between the first set of users, which provide data for the first device, and the second set of users, which provide data for the second device.

The user data may be assembled from one or more sessions of the user interactions with each device. Each session can include one or more events such as touch events. Each touch event may include a list of samples that describe the characteristics of the touch event. For example, each sample may include touch screen coordinates (x,y), touch pressure, touch size, for each detected point in the touch event. Each sample may also include a timestamp indicating the time that the sample was recorded. In some embodiments, the touch events may also include other types of information collected from sensors of the mobile device during the touch event, such as the orientation of the mobile device, or movement of the mobile device, for example.

At block 304, user dependent features of various types may be generated based on the touch events. A feature describes a detected pattern that characterizes the user's interactions with the device. For example, some features may describe an entire swipe distance (end to end), swipe average speed, swipe general direction, swipe gradient, a Euclidean distance between swipes, acceleration throughout the swipe, swipe curvature, and others. Several different types of features may be defined according to the design details of a specific implementation. For each of the features, a first set of features are generated from the user-device interactions of the first set of users, and a second set of features are generated from the user-device interactions of the second set of users.

Next, as indicated at block 306, each of the features are traversed and the feature data of the different users are analyzed to identify the shiftable or adaptable features. Each feature will be represented by a collection of feature samples, each sample pertaining to a different user. The analysis is performed in two stages show as blocks 308 and 310.

At block 308, the extracted features for one of the devices is compared to the corresponding extracted features for the other device and a score for the feature is generated. The feature score indicates the probability that the feature samples for that feature can be shifted between the two devices, i.e., that the feature samples from one device can be transferred to the behavior model applicable to the other device.

The scoring can be done in many different methods to produce a score for each feature. In one embodiment, the scores can be generated by using the Kullback-Leibler (KL) divergence to evaluate the differences between the distributions of the feature samples applicable to the first device versus the feature samples applicable to the second device.

In another embodiment, a machine learning classifier such as random forest classifier or gradient boosting classifier can be built to differentiate between the feature samples applicable to the first device versus the feature samples applicable to the second device, and the feature importance metric could be used for feature scoring.

In another embodiment, a classifier can be applied one feature at a time to differentiate between the feature samples pertaining to the two devices and the AUC (Area Under Curve) of the results could be used for scoring.

In another embodiment, the feature score can be based on statistical comparisons of average and standard deviation of the feature samples pertaining the first device versus the average and standard deviation of the feature samples pertaining the second device. If the samples of a certain feature follow a normal distribution, then the fisher's linear discriminant could be used as the feature score. The fisher's linear discriminant uses the average and standard deviation of the feature samples to build a classifier that attempts to obtain good separation between the two classes (two devices). In cases where the feature can be used to obtain good separation, the feature may be identified as not suitable for shifting between devices.

In each of the above methods, the generated feature score indicates the degree to which the feature can be used to discriminate between devices, i.e., the degree to which the feature can be used to identify the device in use. The more likely that the feature can be used to discriminate between devices, the less likely it will be that the feature can be successfully transferred across devices in its current form.

If the feature score is equal to or below a specific threshold, then the feature may be identified as a valid feature, meaning that the feature can be shifted between devices. If the score is above the specified threshold, then the feature cannot be shifted between devices as is. In this case, the feature may be disregarded. However, in some embodiments, more attempts may be made to adapt the feature in some way and the process advances to block 310.

At block 310, adaptations may be performed for the features that are above a certain threshold. Adaptations may be performed according to one or more of various possible techniques. For the present description, reference is made to two sets of feature samples $X^a = \{x_1^a, x_2^a \ldots x_n^a\}$ and $X^b = \{x_1^b, x_2^b \ldots x_m^b\}$, where $X^a$ represents the feature values for n users for feature X and device A, and $X^b$ represents the feature values for m users for feature X and device B. Each adaptation describes a transformation that can be performed on the first data set, $X^a$, to arrive at a transformed data set that more closely aligns with the second data set, $X^b$.

In cases where the values follow a normal distribution and have average $\mu^a$ and $\mu^b$ and standard deviation $\sigma^a$ and $\sigma^b$, the adaptations can be done using normalization and de-normalization. This can be done by normalizing every value in the first set of feature samples (reducing by $\mu^a$ and dividing in $\sigma^a$) and then de-normalizing according to the second set of feature samples (multiplying by $\sigma^b$ and adding $\mu^b$).

In some cases, a successful adaptation may be accomplished through quantilization. This can be done by ranking each value in $X^a$ and $X^b$ according to the quantiles in each set of feature samples and then replacing the numbers in the first set of feature samples with a number of the second feature sample that has the same (or most similar) quantile.

Another type of adaptation involves changing the distribution in $X^a$ according to an identified mathematical relationship between the distribution in $X^a$ and the distribution in $X^b$. For example, if the distributions are normal in $X^a$ and log-normal in $X^b$, the feature can be adapted by taking the log of each feature value in the first set of feature samples, $X^a$, to generate the adapted feature values, or vise-versa.

In some cases, the adaptation can be performed by a machine learning algorithm, for example, a deep learning mechanism that is trained to take data from one feature in one device and change it to another.

One or several of the adaptation techniques may be applied automatically in an attempt to identify a suitable adaptation without user intervention. In some embodiments, several adaptations may be performed iteratively. After each iteration, a new feature score may be computed at block 308 by comparing the transformed data set of the first device with the original feature data set applicable to the second device. In each iteration the feature score is compared to the score threshold to determine if the adapted feature can be shifted to the new device as described above in relation to block 308. This process of adaptation may be performed multiple times, using or combining different adaptation techniques, and if the score is not below the threshold after a specified number of attempts, the feature can be discarded.

After all features and all possible feature adaptations have been analyzed, those features that were not below the threshold with or without any form of adaptation are ignored and not inserted to the adaptation metric, and hence will not take part in the newly built behavior model of the users transitioning between the devices. Those features that are below the threshold with or without any form of adaptation are inserted to the adaptation metric and can be used in the new behavior model of the transitioning users and are referred as valid features.

Since the above analysis is not user specific, the resulting cross-device adaptation metric generated can be applied to multiple additional users. Accordingly, the resulting cross-device adaptation metric may be used whenever any user is detected as switching between the specific devices that were subject to the analysis. The cross-device adaptation metric identifies each feature of the original device that will still be applicable to the new device, and also describes any adaptations to be applied to the original feature data for each feature. The selected cross-device features (i.e., features that were scored either without adaptation or with a certain adaptation are referred to as valid features) may be used to generate a new behavior model based on the existing user data from the original device as modified according to the selected cross-device features. The new behavior model may be used for behavioral verification in the new device.

The process described in relation to FIG. 3 can be performed in runtime when the user appears from a new device, or it can be performed in advance to reduce the running time of the behavior model generation. To perform the process in advance, the process may be performed for every possible pairing of a large number of devices. In cases wherein there are thousands of possible devices, there will be millions of possible combinations. Accordingly, preparing all possible combinations in advance may be very demanding. Accordingly, a system administrator may configure the system to prepare in advance a more limited set of possible devices, for example, a certain number of the most popular devices. If the system encounters a device combination not previously stored, an additional device combination may also be processed dynamically according to the specific scenario encountered in real time. The resulting cross-device adaptation metric generated can be added to the database to be reused when the same device pair is encountered in the future.

In some cases, the user may be associated with user interaction data from more than two devices. For example, a particular user may switch from using device 1 to device 2, but the same user may also have used device 3 in the past such that a behavior model exists for device 3. In cases where user data exists for more than one device, the verification system may generate the new behavior model from either of the existing sets of user data associated with the other devices. This may be accomplished, for example, by performing the above process for the existing devices and using the new generated behavior model for the user with features that can be shifted or adapted, or a subset of them.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. Generating user behavior models for verification across devices, comprising:

receiving device usage data generated by monitoring user-device interactions of a first set of users interacting with a first device and a second set of users interacting with a second device;

for each one of a set of features:

generating a first set of feature samples from the user-device interactions of the first set of users, and generating a second set of feature samples from the user-device interactions of the second set of users;

generating a score for the feature based on an analysis of the first set of feature samples and the second set of feature samples, wherein the feature score indicates a degree to which the first set of feature samples and the second set of feature samples differentiate between the devices;

identifying the feature as transferrable upon the score being below a specified threshold; and for a specific user, generating a new behavior model for use with a new device by modifying existing user behavior data applicable for an existing device according to the transferrable features.

2. The method of claim 1, comprising analyzing new device usage data of the new device by employing the new behavior model to determine whether to validate an action performed using the new device.

3. The method of claim 1, wherein the score is generated using Kullback-Leibler (KL) divergence to evaluate differences between distributions of the first set of feature samples applicable to the first device versus the second set of feature samples applicable to the second device.

4. The method of claim 1, wherein the score is generated by a classifier built to differentiate between first set of feature samples applicable to the first device versus the second set of feature samples applicable to the second device.

5. The method of claim 4, wherein the feature score is a feature importance metric generated by the classifier taking the data from each device and labeling it according to the device.

6. The method of claim 1, wherein the feature score is based on statistical comparison of average and standard deviation of first set of feature samples applicable to the first device versus the second set of feature samples applicable to the second device.

7. The method of claim 1, comprising, for each one of the set of features:
upon the score being above the specified threshold, applying an adaptation to the first set of feature samples to obtain adapted feature samples; and
generating a new score based on an analysis of the adapted feature samples and the second set of feature samples, wherein the new score indicates a degree to which the adapted feature samples and the second set of feature samples differentiate between the devices; and
identifying the adaptation as valid for the feature upon the new score being below the specified threshold.

8. The method of claim 1, wherein applying the adaptation comprises:
normalizing each value in the first set of feature samples according to an average and standard deviation of the first set of feature sample to generate normalized values; and
denormalizing the normalized values according to an average and standard deviation of the second set of feature samples.

9. The method of claim 1, wherein applying the adaptation comprises:
ranking each value in the first set of feature samples according to quantiles in the first set feature samples;
ranking each value in the second set of feature samples according to quantiles in the second set feature samples; and
replacing those values in the first set of feature samples with a value of the second feature sample that has the same or most similar quantile.

10. The method of claim 1, wherein applying the adaptation comprises changing the distribution in the first set of feature samples according to an identified mathematical relationship between the distribution in the first set of feature samples and the distribution in the second set of feature samples.

11. A system for generating user behavior models, comprising:
at least one memory storage device to store usage data generated by monitoring user-device interactions of a first set of users interacting with a first device and a second set of users interacting with a second device; and
at least one processor configured to, for each one of a set of features:
generate a first set of feature samples from the user-device interactions of the first set of users, and generate a second set of feature samples from the user-device interactions of the second set of users;
generate a score for the feature based on an analysis of the first set of feature samples and the second set of feature samples, wherein the feature score indicates a degree to which the first set of feature samples and the second set of feature samples differentiate between the devices; and
identify the feature as transferrable upon the score being below a specified threshold;
wherein a new behavior model for use with a new device can be generated by modifying existing user behavior data applicable for an existing device according to the transferrable features.

12. The system of claim 11, wherein the score is generated using Kullback-Leibler (KL) divergence to evaluate differences between distributions of the first set of feature samples applicable to the first device versus the second set of feature samples applicable to the second device.

13. The system of claim 11, wherein the score is generated by a classifier built to differentiate between first set of feature samples applicable to the first device versus the second set of feature samples applicable to the second device.

14. The system of claim 13, wherein the feature score is a feature importance metric generated by the classifier.

15. The system of claim 11, wherein the feature score is based on statistical comparison of average and standard deviation of first set of feature samples applicable to the first device versus the second set of feature samples applicable to the second device.

16. The system of claim 11, wherein, for each one of the set of features, the at least one processor is further configured to:
upon the score being above the specified threshold, apply an adaptation to the first set of feature samples to obtain adapted feature samples; and
generate a new score based on an analysis of the adapted feature samples and the second set of feature samples, wherein the new score indicates a degree to which the adapted feature samples and the second set of feature samples differentiate between the devices; and
identify the adaptation as valid for the feature upon the new score being below the specified threshold.

17. The system of claim 11, wherein to apply the adaptation, the at least one processor is to:
normalize each value in the first set of feature samples according to an average and standard deviation of the first set of feature sample to generate normalized values; and
denormalize the normalized values according to an average and standard deviation of the second set of feature samples.

18. The system of claim 11, wherein to apply the adaptation, the at least one processor is to:
rank each value in the first set of feature samples according to quantiles in the first set feature samples;
rank each value in the second set of feature samples according to quantiles in the second set feature samples; and
replace those values in the first set of feature samples with a value of the second feature sample that has the same or most similar quantile.

19. A computer program product comprising a computer readable storage medium having program instructions embodied therewith, wherein the computer readable storage medium is not a transitory signal per se, and wherein the program instructions are executable by a processor to cause the processor to:

receive device usage data generated by monitoring user-device interactions of a first set of users interacting with a first device and a second set of users interacting with a second device;

for each one of a set of features:

generate a first set of feature samples from the user-device interactions of the first set of users, and generate a second set of feature samples from the user-device interactions of the second set of users;

generate a score for the feature based on an analysis of the first set of feature samples and the second set of feature samples, wherein the feature score indicates a degree to which the first set of feature samples and the second set of feature samples differentiate between the devices;

identify the feature as transferrable upon the score being below a specified threshold; and for a specific user, generate a new behavior model for use with a new device by modifying existing user behavior data applicable for an existing device according to the transferrable features.

20. The computer program product of claim 19, wherein the program instructions are executable by the processor to cause the processor to, for each one of the set of features:

upon the score being above the specified threshold, apply an adaptation to the first set of feature samples to obtain adapted feature samples;

generate a new score based on an analysis of the adapted feature samples and the second set of feature samples, wherein the new score indicates a degree to which the adapted feature samples and the second set of feature samples differentiate between the devices; and identify the adaptation as valid for the feature upon the new score being below the specified threshold.

\* \* \* \* \*